US012195044B2

(12) United States Patent
Schwegler et al.

(10) Patent No.: US 12,195,044 B2
(45) Date of Patent: Jan. 14, 2025

(54) METHOD OR SYSTEM USING HUMAN DRIVING CHARACTERISTICS IN AUTONOMOUS DRIVING METHOD OR SYSTEM

(71) Applicant: Continental Automotive Systems, Inc., Auburn Hills, MI (US)

(72) Inventors: Jason Brian Schwegler, Grand Blanc, MI (US); Gustavo M. Nunes, Midland, MI (US); Omkar Karve, Farmington Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 188 days.

(21) Appl. No.: 17/984,653

(22) Filed: Nov. 10, 2022

(65) Prior Publication Data

US 2024/0157970 A1 May 16, 2024

(51) Int. Cl.
*B60W 60/00* (2020.01)
*B60W 40/08* (2012.01)
*B60W 40/109* (2012.01)
*B60W 40/11* (2012.01)
*B60W 40/112* (2012.01)
*B60W 40/114* (2012.01)
*B60W 50/00* (2006.01)

(52) U.S. Cl.
CPC ........ *B60W 60/0015* (2020.02); *B60W 40/08* (2013.01); *B60W 40/109* (2013.01); *B60W 40/11* (2013.01); *B60W 40/112* (2013.01); *B60W 40/114* (2013.01); *B60W 50/0098* (2013.01); *B60W 2050/0083* (2013.01); *B60W 2520/125* (2013.01); *B60W 2520/14* (2013.01); *B60W 2520/16* (2013.01); *B60W 2520/18* (2013.01)

(58) Field of Classification Search
CPC .... B60W 40/08; B60W 40/09; B60W 40/109; B60W 40/11; B60W 40/112; B60W 40/114; B60W 50/0098; B60W 60/0015; B60W 2050/0075; B60W 2050/0083; B60W 2050/0088; B60W 2520/125; B60W 2520/14; B60W 2520/16; B60W 2520/18
USPC .......................................................... 701/23
See application file for complete search history.

(56) References Cited

U.S. PATENT DOCUMENTS

| | | | | |
|---|---|---|---|---|
| 9,956,963 | B2* | 5/2018 | Vijaya Kumar | B60W 40/08 |
| 10,671,865 | B2* | 6/2020 | Kim | G06V 20/584 |
| 11,221,623 | B2* | 1/2022 | Nojoumian | B60W 40/09 |
| 11,782,451 | B1* | 10/2023 | Venkatraman | G05D 1/0221 |
| | | | | 701/26 |
| 2005/0102098 | A1* | 5/2005 | Montealegre | G01C 21/3837 |
| | | | | 701/533 |

(Continued)

FOREIGN PATENT DOCUMENTS

| CN | 113291283 A * | 8/2021 | ............ B60W 10/06 |
|---|---|---|---|
| DE | 102018202146 A1 | 8/2019 | |

(Continued)

OTHER PUBLICATIONS

DE Office Action dated May 19, 2023 for DE application No. 10 2023 105 062.1.

*Primary Examiner* — Atul Trivedi

(57) ABSTRACT

A number of variations may include a method or system using human driving characteristics in autonomous vehicle driving method or system.

14 Claims, 3 Drawing Sheets

(56) References Cited

U.S. PATENT DOCUMENTS

| | | | |
|---|---|---|---|
| 2016/0046298 A1* | 2/2016 | DeRuyck | B60K 28/066 340/576 |
| 2016/0244067 A1* | 8/2016 | Hunt | B60W 30/143 |
| 2017/0285641 A1* | 10/2017 | Goldman-Shenhar | B60W 60/00136 |
| 2017/0370732 A1* | 12/2017 | Bender | G08G 1/096838 |
| 2018/0134215 A1* | 5/2018 | Kim | G07C 5/0825 |
| 2019/0359223 A1* | 11/2019 | Duale | B60W 30/095 |
| 2021/0309261 A1* | 10/2021 | Rosales | B60W 60/001 |
| 2021/0370905 A1* | 12/2021 | Hawley | B60W 20/40 |
| 2021/0394710 A1* | 12/2021 | Hu | B60W 40/09 |
| 2021/0407319 A1* | 12/2021 | Urano | B60W 60/0059 |
| 2022/0083056 A1* | 3/2022 | Moran | B60W 30/0956 |
| 2022/0126850 A1* | 4/2022 | Li | G05D 1/0221 |
| 2022/0153302 A1* | 5/2022 | Arechiga-Gonzalez | B60W 50/14 |
| 2022/0194401 A1* | 6/2022 | Gee | B60W 50/10 |
| 2022/0234616 A1* | 7/2022 | Anami | B60W 50/14 |
| 2022/0244727 A1* | 8/2022 | Bojarski | G06N 3/08 |
| 2022/0274603 A1* | 9/2022 | Karve | G06N 3/047 |
| 2023/0034419 A1* | 2/2023 | Abe | B60W 60/0059 |
| 2023/0048774 A1* | 2/2023 | Gupta | B60W 10/06 |
| 2023/0084924 A1* | 3/2023 | White | G01C 21/32 701/23 |
| 2023/0102095 A1* | 3/2023 | Hsu | B60W 60/0015 701/23 |
| 2023/0102898 A1* | 3/2023 | Hsu | B60W 60/0015 340/5.61 |
| 2023/0110027 A1* | 4/2023 | Bajpayee | B60W 30/09 701/301 |
| 2023/0110713 A1* | 4/2023 | Degirmenci | G06N 3/0442 701/24 |
| 2023/0219569 A1* | 7/2023 | Zhao | B60W 60/001 701/23 |
| 2023/0278572 A1* | 9/2023 | Stent | B60W 50/10 701/23 |
| 2023/0351638 A1* | 11/2023 | Wu | G06V 10/25 |
| 2023/0351769 A1* | 11/2023 | Wu | G06V 10/762 |
| 2023/0399016 A1* | 12/2023 | Donderici | B60W 10/20 |
| 2024/0010196 A1* | 1/2024 | Leung | B60W 60/0015 |
| 2024/0067182 A1* | 2/2024 | Persson | G06V 10/25 |
| 2024/0096102 A1* | 3/2024 | Popov | G01S 17/931 |
| 2024/0161342 A1* | 5/2024 | Sen | G01S 17/89 |
| 2024/0211748 A1* | 6/2024 | Sajjan | G06N 3/045 |
| 2024/0249118 A1* | 7/2024 | Benkert | G06N 3/08 |
| 2024/0280372 A1* | 8/2024 | Abbott | G01C 21/3644 |

FOREIGN PATENT DOCUMENTS

| | | | | |
|---|---|---|---|---|
| DE | 102018204288 A1 | | 9/2019 | |
| DE | 102019133034 A1 | | 7/2020 | |
| DE | 102021133415 A1 | | 6/2022 | |
| DE | 102023200973 A1 | * | 10/2023 | ............ B60W 40/09 |
| EP | 4283553 A1 | * | 11/2023 | ............ B60W 40/08 |

* cited by examiner

METHOD OR SYSTEM USING HUMAN DRIVING CHARACTERISTICS IN AUTONOMOUS DRIVING METHOD OR SYSTEM

TECHNICAL FIELD

The field to which the disclosure generally relates to a method or system using human driving characteristics in autonomous vehicle driving method or system.

BACKGROUND

Vehicles may include controllers or systems having autonomous driving capabilities.

SUMMARY OF ILLUSTRATIVE VARIATIONS

A number of variations may include a method or system using human driving characteristics in an autonomous vehicle driving method or system.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
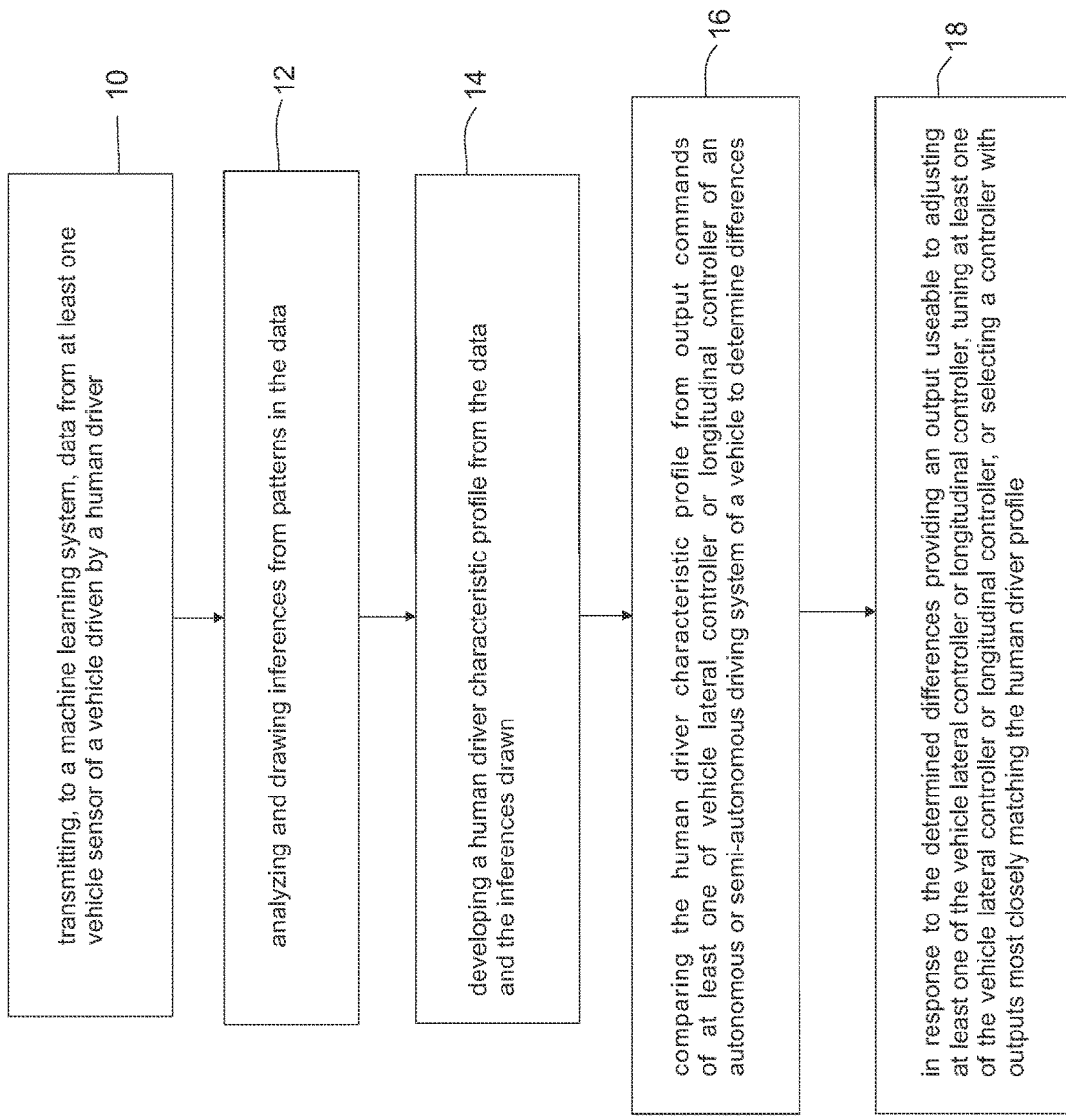
FIG. 1 illustrates a method of using human driving characteristics in a method or system an autonomous vehicle driving method or system.

The following description of the variations is merely illustrative in nature and is in no way intended to limit the scope of the invention, its application, or uses.

A number of variations may include the use of a machine learning system to adjust presets or operating thresholds and limits for an intelligent vehicle driving system such as, but not limited to, an autonomous or semi-autonomous driving system. The machine learning system may be constructed and arranged to learn and adapt without following explicit instructions, by using algorithms and statistical models to analyze and draw inferences from patterns in data. In a number of variations, the machine learning system may include, but is not limited, a neural network, artificial intelligence system, or deep learning system. In a number of variations, the method or system may collect data regarding the driving characteristics of a human driving the vehicle in manual mode without an autonomous or semi semi-autonomous vehicle driving system being active. While a human is driving the vehicle, signals or data are collected from one or more sensors positioned in the vehicle to collect input regarding the vehicle speed acceleration, deceleration, pitch, roll, yaw, and rates of change thereof. The machine learning system may be included in the vehicle or maybe located remotely from the vehicle. The signals or date may be transmitted directly to the machine learning system in real time or may be stored onboard the vehicle the transmitted to or received by the machine learning system at a later date. Signals or data collected related to the vehicle speed, acceleration, deceleration, pitch, roll, yaw and rates of change thereof may be transmitted to or received by the machine learning system to develop driving characteristics of a human driver in general or driving characteristics of a particular human driver of the vehicle. The human driver driving characteristics may be compared to output commands from various types of lateral and longitudinal controllers of the vehicle. In a number of variations, a scoring or weighting criteria may be applied to either adjust, tune or select the vehicle controllers. In a number of variations, the human driver driving characteristics developed by the machine learning system may be used to adjust presets or operating thresholds and limits for an intelligent vehicle driving system within ultimate safety limits for operation of the intelligent vehicle driving system.

in a number of variations, the intelligent learning system takes inputs from manual driving and outputs from predetermined traditional vehicle controllers along with environmental data such as speed, comfort, driving profile, space, terrain, and so on. Then the machine learning system compares the outputs of various lateral and longitudinal controllers with inputs from the manual driving and determines which controllers best match the manual driving. This may be repeated for various driving scenarios over multiple vehicles via V2X (V2X is Vehicle to Infrastructure) to generate a database for further evaluating and tuning controller performance to make outputs more humanlike. The machine learning system may also generate weightage factors for metrics that influence various requirements such as comfort and performance.

The adjustments of presets or threshold and limits of the intelligent vehicle driving system may be made while the intelligent vehicle driving system is not operational. For example, adjustments to the intelligent vehicle driving system may be made when the intelligent driving system is placed in a sleep mode, is made nonoperational, when the vehicle is in manual driving mode only, or when the vehicle is turned off.

Each of the intelligent vehicle driving system and the machine learning system may include a non-transitory computer media with instructions thereon, executable by an electronic processor, to cause a set of actions or functions to be performed.

In a number of variations, the machine learning system takes inputs from sensors while the human driver is manually driving the vehicle, and outputs from predetermined controllers along with environmental data such as speed, comfort, driving profile, space or terrain. Then the machine learning system compares the outputs of various lateral and longitudinal controllers of the vehicle with the inputs from the human driver manual driving and determines which controllers best match the inputs from the human manual driving and uses the best matched controllers too intelligently control the vehicle without manual input. This may be repeated for various driving scenarios over multiple vehicles via V2X to generate a database for further evaluating and tuning controller performance to make outputs more humanlike.

FIG. 1 illustrates a method according to a number of variations, which may include the acts of transmitting, to a machine learning system, data from at least one vehicle sensor of a vehicle driven by a human driver 10; analyzing and drawing inferences from patterns in the data 12; developing a human driver characteristic profile from the data and the inferences drawn 14; comparing the human driver characteristic profile from output commands of at least one of vehicle lateral controller or longitudinal controller of an autonomous or semi-autonomous driving system of a vehicle to determine differences 16; and in response to the determined differences providing an output useable to adjusting at least one of the vehicle lateral controller or longitudinal controller, tuning at least one of the vehicle lateral controller or longitudinal controller, or selecting a controller with outputs most closely matching the human driver profile 18.

Figure 2:
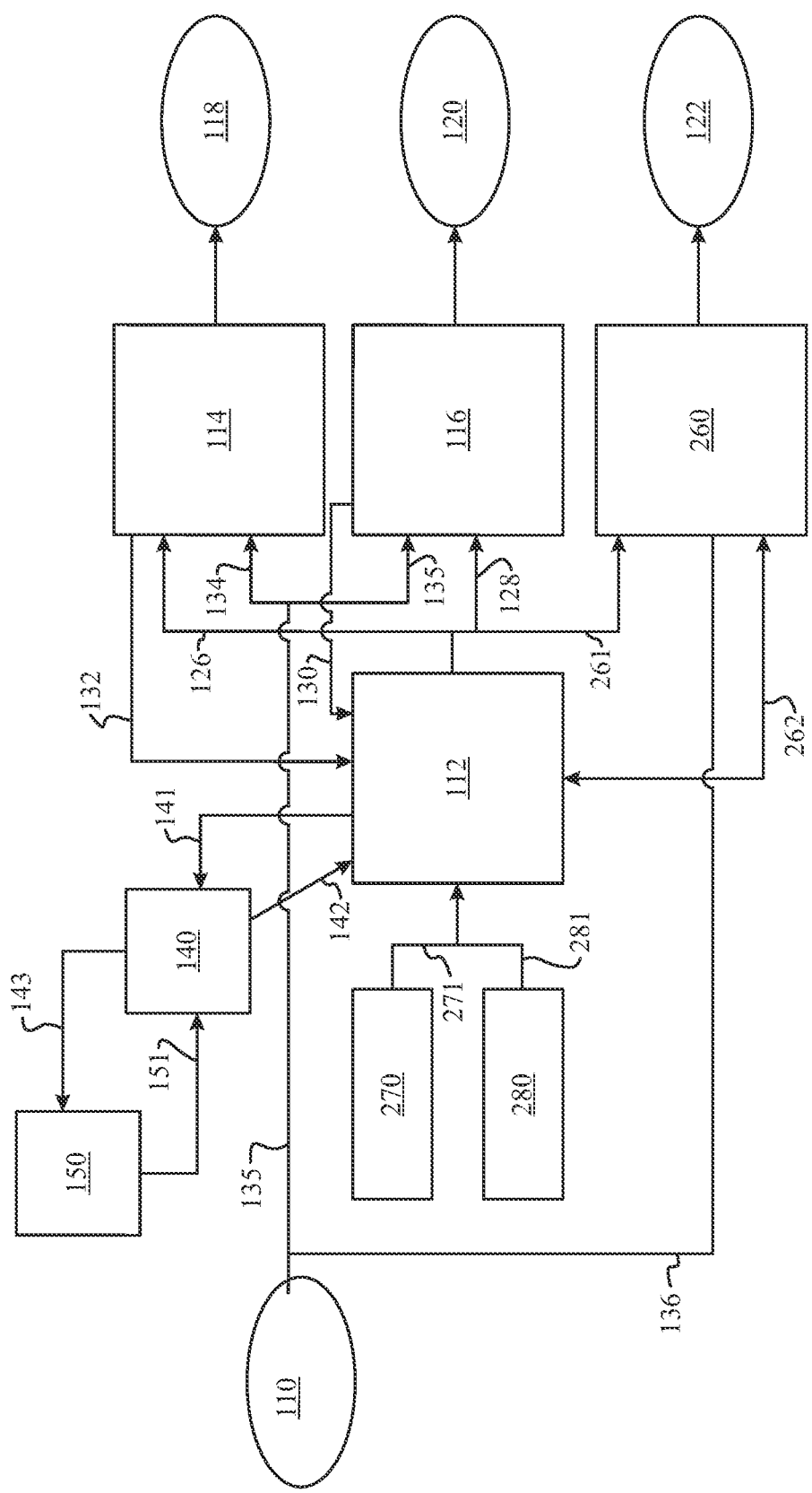
FIG. 2 depicts an illustrative variation of a block diagram of a system and method which may be used to accomplish one or more of the functions and acts described herein.

FIG. 2 depicts an illustrative variation of block diagram of a system and method which may be used to accomplish functions and acts described herein. A vehicle may include a controller 112 may include a non-transitory computer readable medium having instructions stored there on, and an electronic processor for executing the instructions to accomplish functions and acts described herein. In a number of variations, the system may include only one controller 112, or the system may include multiple controllers each having a non-transitory computer readable medium having instructions stored there on, and an electronic processor for executing the instructions to accomplish at least one of the functions and acts described herein. The vehicle may include a controller 112 constructed and arranged to receive driver steering input 134 via a steering system 114. The controller 112 may additionally be constructed and arranged to provide steering actuator commands 126 to the steering system 114. The steering system 114 may output tire angle changes 118 to affect steering system health status 132 to the controller 112. The controller 112 may also be constructed and arranged to provide braking commands 128 to an electric braking system 116 which, in turn, may apply brake pressure 120 to individual brake calipers. Where sensors and or the steering system 114 has indicated to the controller 112 that an evasive maneuver is underway, the controller 112 may send a brake movement request to provide differential braking at all roadwheels to increase yaw rate of the vehicle. If the steering system 114 indicates that a power steering assist has failed, the controller 112 may receive driver input 134 via a steering wheel and convert steering requests into brake pressure requests or commands 128 to be communicated to the electric braking system 116. The controller 112 may also receive input 271 from a variety of devices 270 designed to measure vehicle state information including, but not limited to lateral acceleration, yaw rate, wheel speed. The controller may receive input 281 from a variety of devices 280 that may include, but not limited to, gps, cameras, lidars, and radars that may be used in the algorithm to estimate a variety of vehicle states. The estimated vehicle states may be helpful, for example but not limited to, when steering wheel angle, torque, velocity sensors are not available. A longitudinal dynamic controller 260 may be provided to send torque request to accelerate or decelerate the front roadwheels wheels and/or rear roadwheels. The longitudinal dynamic controller 260 may receive input 261 from the controller 112 and may send output 262 to the controller 112. In a number of variations, a propulsion system may include separately controlled electric motor to provide a differential driving force to each roadwheel. The controller 140 collects driver attributes through interface 141 and sends this data via link 143 to off board servers to analyze and update the profile for the specific driver. The updated configurations are then returned to the vehicle via interface 151 to controller 140. At an opportune time (overnight or via driver request), the controller 140 will update the profile in controller 112 via interface 142.

Figure 3:
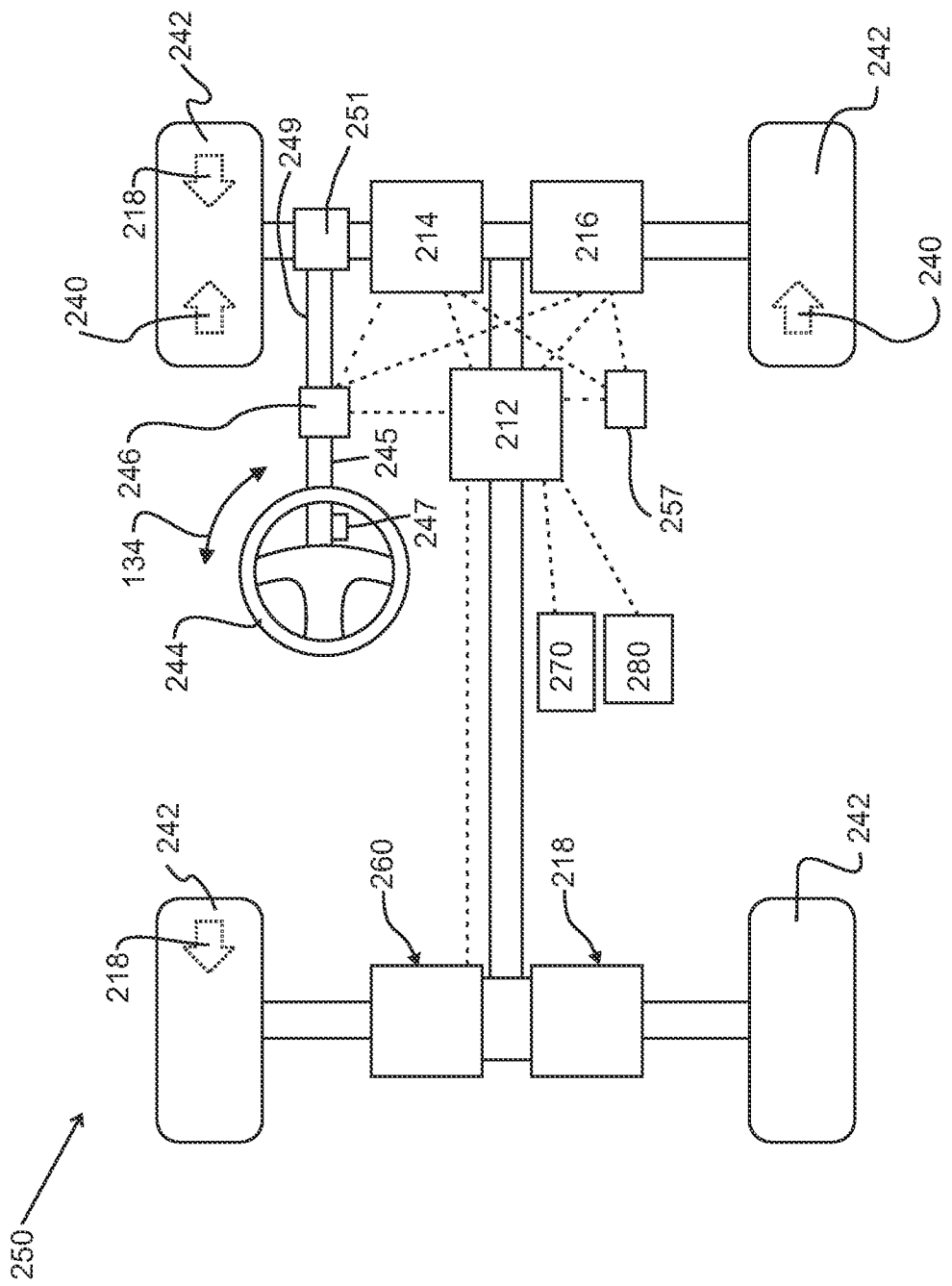
FIG. 3 depicts an illustrative variation of a vehicle equipped with hardware sufficient for carrying out at least some of the systems and methods described herein.

FIG. 3 depicts an illustrative variation of portions of a vehicle equipped with hardware sufficient for carrying out at least some of the systems and methods described herein. A vehicle 250 may include a controller 212 constructed in a vehicle 250. The controller 212 may be in operable communication with a steering system 214 and an electric braking system 216. The steering system 214 and an electric braking system 216 may be in operable communication with at least one road wheel 242. A driver may utilize a handwheel 244 to provide driver input 134 for lateral movement and send steering requests to the steering system 214. In some variations, a steering assist 246 associated with the steering interface 244 may be in operable communication with the controller 212, the steering system 214, or the electric braking system 216. The controller may receive input 281 from a variety of devices 280 that may include, but not limited to, gps, cameras, lidars, and radars that may be used in the algorithm to estimate a variety of vehicle states. The estimated vehicle states may be helpful, for example but not limited to, when steering wheel angle, torque, velocity sensors are not available. The controller 212 may receive input and send output to a propulsion system 218.

Variation 1 may include a method of using human driving characteristics in an autonomous or semi-autonomous vehicle, the method comprising: transmitting, to a machine learning system, data from at least one vehicle sensor of a vehicle driven by a human driver; wherein the machine learning system includes a non-transitory computer readable medium having instructions stored there on, executable by an electronic processor, causing the machine learning system to perform the acts of: analyzing and drawing inferences from patterns in the data; developing a human driver characteristic profile from the data and the inferences drawn; comparing the human driver characteristic profile from output commands of at least one of vehicle lateral controller or longitudinal controller of an autonomous or semi-autonomous driving system of a vehicle to determine differences; in response to the determined differences providing an output useable to adjusting at least one of the vehicle lateral controller or longitudinal controller, tuning at least one of the vehicle lateral controller or longitudinal controller, or selecting a controller with outputs most closely matching the human driver profile.

Variation 2 may include a method a set forth in Variation 1 wherein the developing a human driver characteristic profile comprises scoring or weighting the data.

Variation 3 may include a method as set forth in any of Variations 1-2 wherein the human driver characteristic profile is within preset thresholds and limits of the output commands of at least one of vehicle lateral controller or longitudinal controller.

Variation 4 may include a method as set forth in any of Variations 1-3 wherein the adjusting at least one of the vehicle lateral controller or longitudinal controller, or tuning at least one of the vehicle lateral controller or longitudinal controller is within the outer safety limits for operating the autonomous or semi-autonomous vehicle.

Variation 5 may include a method as set forth in any of Variations 1-4 wherein the data is related to at least one of the vehicle acceleration, deceleration, pitch, roll, yaw, or rates of change of one of more of the same.

Variation 6 may include a method as set forth in any of Variations 1-5 wherein the data is related to at least one of comfort, driving profile, space, or terrain.

Variation 7 may include a method as set forth in any of Variations 1-6 further comprising using the output to adjust at least one of the vehicle lateral controller or longitudinal controller, tune at least one of the vehicle lateral controller or longitudinal controller, or select a controller with outputs most closely matching the human driver profile.

Variation 8 may include a method as set forth in any of Variations 1-7 further comprising operating the vehicle in an autonomous or semi-autonomous mode.

Variation 9 may include a system comprising a non-transitory computer readable medium having instructions stored there on, a processor for executing the instructions to perform the acts of using human driving characteristics in an autonomous or semi-autonomous vehicle comprising: receiving data from at least one vehicle sensor of a vehicle driven by a human driver; analyzing and drawing inferences from patterns in the data; developing a human driver characteristic profile from the data and the inferences drawn; comparing the human driver characteristic profile from output commands of at least one of vehicle lateral controller or longitudinal controller of an autonomous or semi-autonomous driving system of a vehicle to determine differences; in response to the determined differences providing an output useable to adjusting at least one of the vehicle lateral controller or longitudinal controller, tuning at least one of the vehicle lateral controller or longitudinal controller, or selecting a controller with outputs most closely matching the human driver profile.

Variation 10 may include a system as set forth in Variation 9 wherein the developing a human driver characteristic profile comprises scoring or weighting the data.

Variation 11 may include a system as set forth in any of Variations 9-10 wherein the human driver characteristic profile is within preset thresholds and limits of the output commands of at least one of vehicle lateral controller or longitudinal controller.

Variation 12 may include a system as set forth in any of Variations 9-11 wherein the adjusting at least one of the vehicle lateral controller or longitudinal controller, or tuning at least one of the vehicle lateral controller or longitudinal controller is within the outer safety limits for operating the autonomous or semi-autonomous vehicle.

Variation 13 may include a system as set forth in any of Variations 9-12 wherein the data is related to at least one of the vehicle acceleration, deceleration, pitch, roll, yaw, or rates of change of one of more of the same.

Variation 14 may include a system as set forth in any of Variations 9-13 wherein the data is related to at least one of comfort, driving profile, space, or terrain.

Variation 15 may include a system as set forth in any of Variations 9-14 further comprising producing an output to adjust at least one of the vehicle lateral controller or longitudinal controller, tune at least one of the vehicle lateral controller or longitudinal controller, or select a controller with outputs most closely matching the human driver profile.

Variation 16 may include a non-transitory computer readable medium having instructions stored there on, executable by an electronic processor, to perform the acts of using human driving characteristics in an autonomous or semi-autonomous vehicle comprising: receiving data from at least one vehicle sensor of a vehicle driven by a human driver; analyzing and drawing inferences from patterns in the data; developing a human driver characteristic profile from the data and the inferences drawn; comparing the human driver characteristic profile from output commands of at least one of vehicle lateral controller or longitudinal controller of an autonomous or semi-autonomous driving system of a vehicle to determine differences; in response to the determined differences providing an output useable to adjusting at least one of the vehicle lateral controller or longitudinal controller, tuning at least one of the vehicle lateral controller or longitudinal controller, or selecting a controller with outputs most closely matching the human driver profile.

Variation 17 may include the medium as set forth in Variation 16 wherein the developing a human driver characteristic profile comprises scoring or weighting the data.

Variation 18 may include a medium as set forth in any of Variations 16-17 wherein the human driver characteristic profile is within preset thresholds and limits of the output commands of at least one of vehicle lateral controller or longitudinal controller.

Variation 19 may include a medium as set forth in any of Variations 16-18 wherein the adjusting at least one of the vehicle lateral controller or longitudinal controller, or tuning at least one of the vehicle lateral controller or longitudinal controller is within the outer safety.

Variation 20 may include a medium as set forth in any of Variations 16-19 wherein the data is related to at least one of the vehicle acceleration, deceleration, pitch, roll, yaw, or rates of change of one of more of the same.

The above description of select variations within the scope of the invention is merely illustrative in nature and, thus, variations or variants thereof are not to be regarded as a departure from the spirit and scope of the invention.

What is claimed is:

1. A method of controlling a vehicle, the method comprising:
    obtaining data from at least one vehicle sensor of the vehicle driven by a human driver;
    determining from the data a human driver characteristic profile describing control of the vehicle driven by the human driver;
    comparing the human driver characteristic profile to output commands describing control of the vehicle driven by: a first vehicle motion controller comprising at least one of a first vehicle lateral controller or a first longitudinal controller of an autonomous or semi-autonomous driving system of the vehicle and a second vehicle motion controller comprising at least one of a second vehicle lateral controller or a second longitudinal controller of the autonomous or semi-autonomous driving system of the vehicle; and
    controlling the vehicle to autonomously or semi-autonomously drive using a vehicle motion controller from among the first controller and the second controller for which the output commands most closely match the human driver characteristic profile.

2. The method a set forth in claim 1, wherein determining the human driver characteristic profile comprises scoring or weighting the data.

3. The method as set forth in claim 1, further comprising determining the human driver characteristic profile is within preset thresholds of the output commands of the first vehicle motion controller and the second vehicle motion controller.

4. The method as set forth in claim 1, wherein the data is related to at least one of the vehicle acceleration, deceleration, pitch, roll, yaw, or rates of change of one of more of the same.

5. The method as set forth in claim 1, wherein the data is related to at least one of comfort, driving profile, space, or terrain.

6. A system comprising a non-transitory computer readable medium having instructions stored thereon, and a processor configured to execute the instructions to perform a method of controlling a vehicle, the method comprising:
- obtaining data from at least one vehicle sensor of the vehicle driven by a human driver;
- determining from the data a human driver characteristic profile describing control of the vehicle driven by the human driver;
- comparing the human driver characteristic profile to output commands describing control of the vehicle driven by: a first vehicle motion controller comprising at least one of a first vehicle lateral controller or a first longitudinal controller of an autonomous or semi-autonomous driving system of the vehicle and a second vehicle motion controller comprising at least one of a second vehicle lateral controller or a second longitudinal controller of the autonomous or semi-autonomous driving system of the vehicle; and
- controlling the vehicle to autonomously or semi-autonomously drive using a vehicle motion controller from among the first controller and the second controller for which the output commands most closely match the human driver characteristic profile.

7. The system a set forth in claim 6, wherein determining the human driver characteristic profile comprises scoring or weighting the data.

8. The system as set forth in claim 6, wherein the method further comprises determining the human driver characteristic profile is within preset thresholds of the output commands of the first vehicle motion controller and the second vehicle motion controller.

9. The system as set forth in claim 6, wherein the data is related to at least one of the vehicle acceleration, deceleration, pitch, roll, yaw, or rates of change of one of more of the same.

10. The system as set forth in claim 6, wherein the data is related to at least one of comfort, driving profile, space, or terrain.

11. A non-transitory computer readable medium having instructions stored there on, executable by an electronic processor, to perform a method of controlling a vehicle, the method comprising:
- obtaining data from at least one vehicle sensor of the vehicle driven by a human driver;
- determining from the data a human driver characteristic profile describing vehicle control of the vehicle driven by the human driver;
- comparing the human driver characteristic profile to output commands describing control of the vehicle driven by: a first vehicle motion controller comprising at least one of a first vehicle lateral controller or a first longitudinal controller of an autonomous or semi-autonomous driving system of the vehicle and a second vehicle motion controller comprising at least one of a second vehicle lateral controller or a second longitudinal controller of the autonomous or semi-autonomous driving system of the vehicle; and
- controlling the vehicle to autonomously or semi-autonomously drive using a vehicle motion controller from among the first controller and the second controller for which the output commands most closely match the human driver characteristic profile.

12. The medium a set forth in claim 11, wherein determining the developing a human driver characteristic profile comprises scoring or weighting the data.

13. The medium as set forth in claim 11, wherein the method further comprises determining the human driver characteristic profile is within preset thresholds and limits of the output commands of the first vehicle motion controller and the second vehicle motion controller.

14. The medium as set forth in claim 11, wherein the data is related to at least one of the vehicle acceleration, deceleration, pitch, roll, yaw, or rates of change of one of more of the same.

* * * * *